United States Patent [19]

Hong

[11] Patent Number: 5,606,947
[45] Date of Patent: Mar. 4, 1997

[54] AUTOMOTIVE ACCELERATION-HORSEPOWER CONTROL MEANS

[76] Inventor: Fu C. Hong, 2F, No. 20, Alley 16, Lane 22, Wen Der Road, Ney Hwu Area, Taipei, Taiwan

[21] Appl. No.: 412,584

[22] Filed: Mar. 29, 1995

[51] Int. Cl.$^6$ .............. F02D 41/10; B60H 1/32; F02P 5/04
[52] U.S. Cl. .............. 123/339.17; 123/409; 62/133; 62/323.4
[58] Field of Search .............. 123/339.17, 409; 62/133, 243, 323.4

[56] References Cited

U.S. PATENT DOCUMENTS

| | | | |
|---|---|---|---|
| 3,638,626 | 2/1972 | Marshall | 123/409 |
| 3,698,366 | 10/1972 | Gropp | 123/409 |
| 4,359,875 | 11/1982 | Ohtani | 62/133 |
| 4,369,634 | 1/1983 | Ratto | 62/133 |
| 4,556,942 | 12/1985 | Russo et al. | 62/323.4 |
| 4,823,555 | 4/1989 | Ohkumo | 62/133 |
| 5,056,326 | 10/1991 | Ohkumo et al. | 62/323.4 |
| 5,228,305 | 7/1993 | Vogt | 62/133 |

FOREIGN PATENT DOCUMENTS 2502814  7/1976  Germany ............... 123/409

Primary Examiner—Willis R. Wolfe
Attorney, Agent, or Firm—Morton J. Rosenberg; David I. Klein

[57] ABSTRACT

An automotive acceleration-horsepower control is provided that consists of a single chip vacuum detection transducer, a comparison circuit, a timing circuit, and an amplification circuit. The vacuum detection transducer detects variations in the intake manifold vacuum and converts the detected vacuum into a voltage signal and sends the signal to the comparison circuit for comparing it with a reference voltage. When the voltage signal is found higher than the reference voltage, an actuating signal is sent by the comparison circuit to the timing circuit which further outputs a delay voltage. The delay voltage is amplified by the amplification circuit to drive a relay to disconnect the air-conditioning compressor of car for a set time at the instant of acceleration and thereby reduces the load of engine.

2 Claims, 2 Drawing Sheets

AUTOMOTIVE ACCELERATION-HORSEPOWER CONTROL MEANS

BACKGROUND OF THE INVENTION

The present invention relates to an automotive acceleration-horsepower control means and more particularly to a structure which can control the automotive air-conditioning compressor by detecting variation in the intake manifold depression (vacuum) and thereby reduces the load of engine.

Due to the constant upgrade of our living standard, cars have become a necessary traffic means for people who deem efficiency an important factor in our daily life. Following the advanced technology nowadays, automotive equipments are largely improved. For example, air-conditioning has become a standard internal equipment to expel oppressive heat from a car, especially in the tropics and the subtropics. A common problem found with a car using the air-conditioning while running is that the engine thereof might be retarded at starting or during accelerating due to a high load of engine. This not only stops the engine from normal operation and has adverse influence on the engine, but also causes unnecessary waste of fuel and undesirable air pollution.

SUMMARY OF THE INVENTION

It is therefore a primary object of the present invention to provide an automotive acceleration-horsepower control means. The means mainly consists of a single chip vacuum detection transducer which detects variation in the intake manifold vacuum and converts the detected variation into a voltage signal and sends the same to a comparison circuit for comparing it with a sampling voltage. When the voltage signal is found higher than the sampling voltage, an actuating signal is sent by the comparison circuit to a timing circuit which further outputs a delay voltage. The delay voltage is amplified by an amplification circuit to drive a relay to properly disconnect the air-conditioning compressor of car for a set time during the instant of starting and accelerating and thereby reduces the load of engine to enhance the running efficiency of car.

Another object of the present invention is to provide a one-way air-pressure-regulating valve connected in series between the intake manifold and an advancing ignition diaphragm so that variation between the intake manifold high/low vacuums can be detected while the car accelerates during running, such that the air-conditioning compressor can be timely disconnected and thereby, enhances the horsepower speedability and minimizes the required fuel.

BRIEF DESCRIPTION OF THE DRAWINGS

The main characteristics and novelty of the present invention will become apparent when referring to the following detailed description of the preferred embodiment and the accompanied drawings wherein.

DETAILED DESCRIPTION OF THE PREFERRED EMBODIMENT

Figure 1:
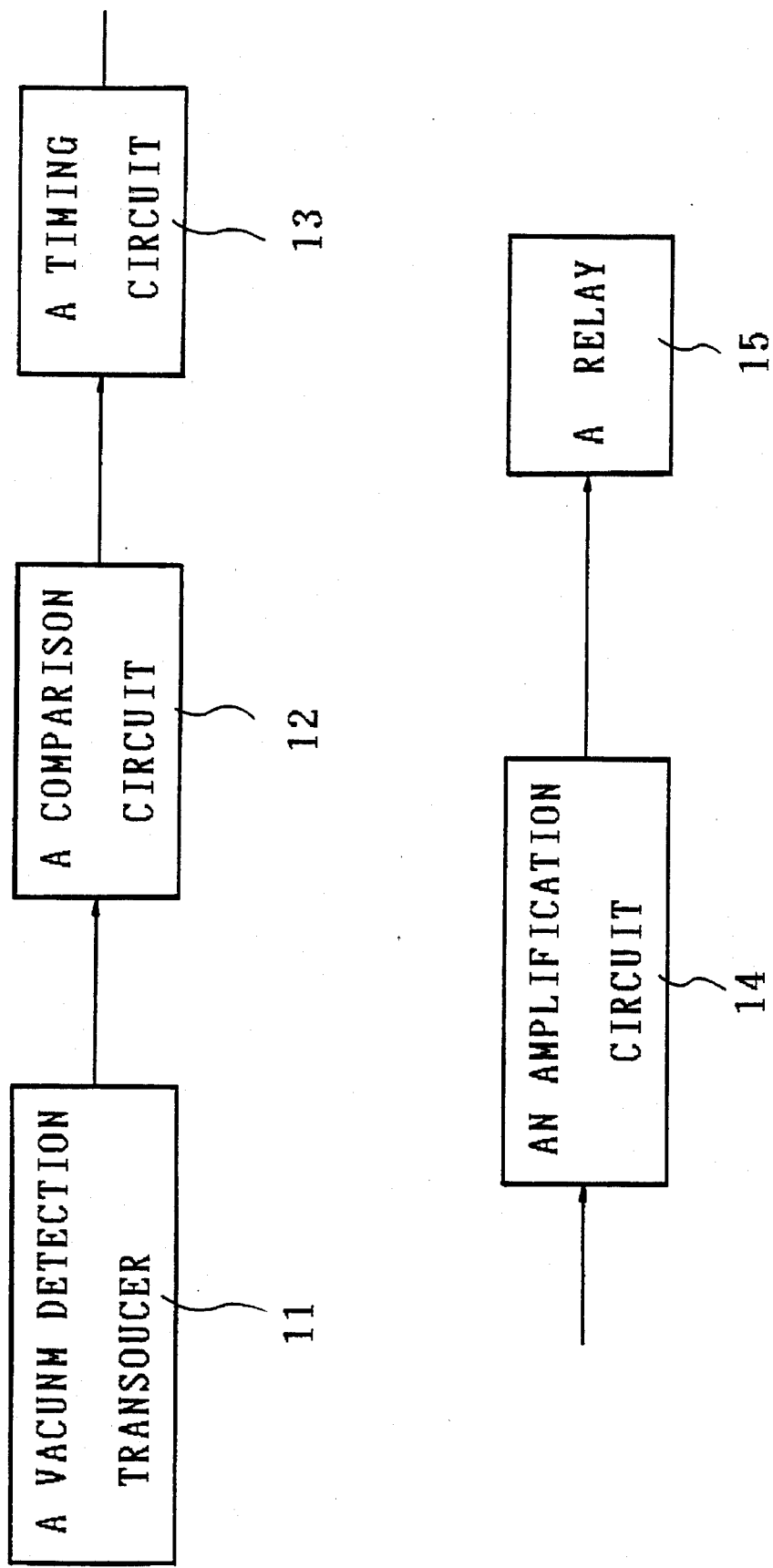
FIG. 1 is a block diagram showing the flow of operation of the present invention.

Please refer to FIG. 1. The present invention of an automotive acceleration-horsepower control means mainly consists of a single chip vacuum detection transducer 11 for detecting variation in the intake manifold vacuum and converting the detected variation into a signal voltage, a comparison circuit 12 for comparing the signal voltage from the vacuum detection single chip 11 with a reference voltage, a timing circuit 13 for receiving the signal sent from the comparison circuit 12 and causing, for a set time, an amplification circuit 14 to drive a relay 15 to properly disconnect an air-conditioning compressor in a car.

Figure 2:
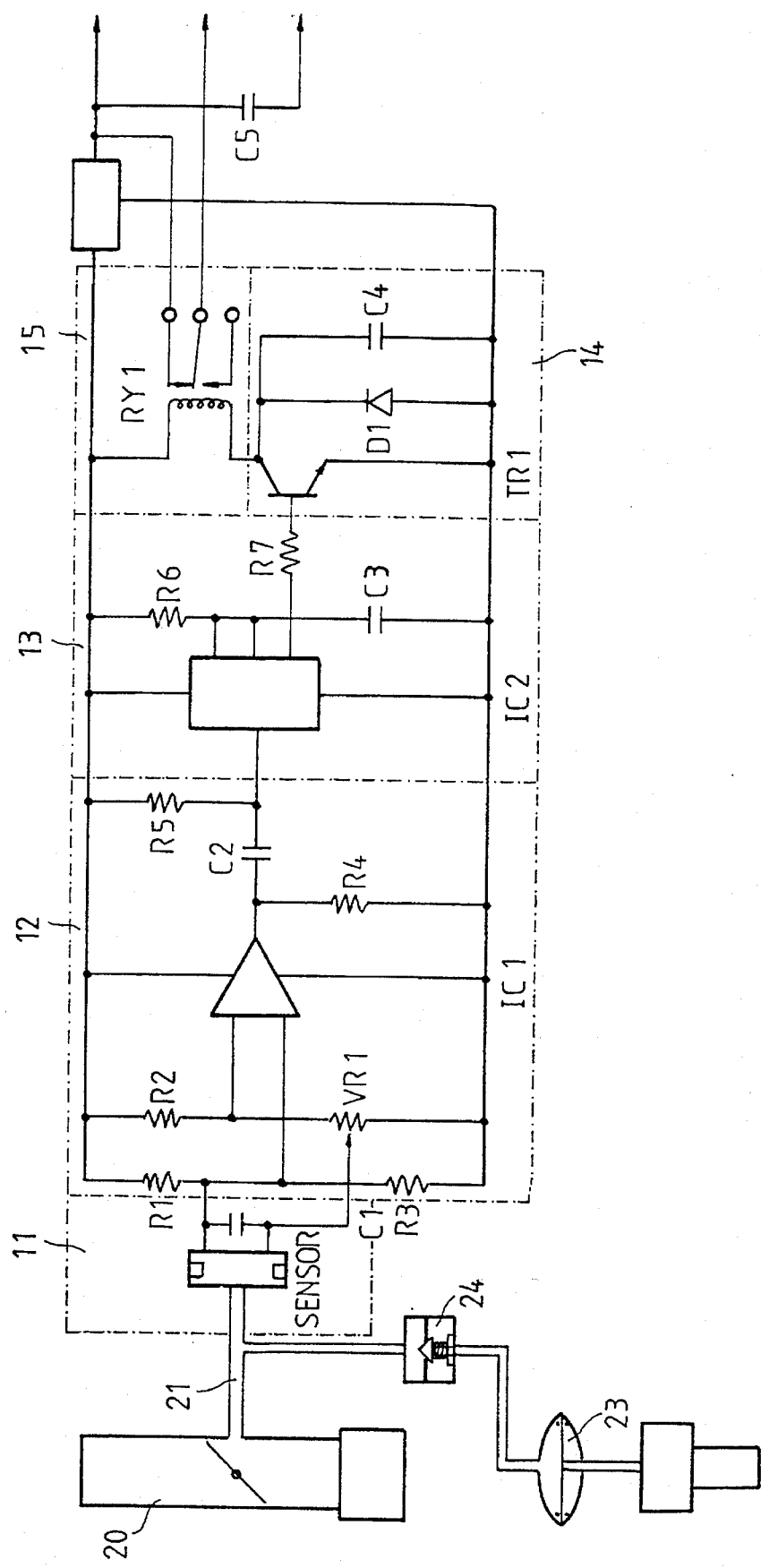
FIG. 2 is a circuit diagram of a preferred embodiment of the present invention.

Please refer to FIG. 2 in which a circuit diagram of a preferred embodiment of the present invention is shown. The single chip vacuum detection transducer 11 detects a vacuum pressure differential in an intake manifold 21 connecting with an engine chamber 20, the detected pressure differential is converted into a voltage signal and sent to a comparator IC1 to be compared with a reference voltage set by R2 and VR1 which are connected with the IC1. When the detected voltage is found higher than the set voltage, an actuating signal is output by the comparator IC1 to actuate the timing circuit 13 which is a monostable time control circuit consisting of a timing integrated circuit IC2, resistor R6, and capacitor C3 to output a voltage for a set time (about 4 seconds), the output voltage is sent to transistor TR1 via R7 and is amplified to drive relay RY1 to open normally closed control and thereby disconnects the air-conditioning compressor.

Furthermore, a one-way air-pressure-regulating valve 24 is connected in series between the intake manifold 21 and an advancing ignition diaphragm 23. When a car is accelerated while running, a large volume of air and fuel enter into the engine chamber 20 which lowers the intake manifold vacuum and thereby advances the ignition, causing the intake manifold vacuum changes from high vacuum to low vacuum and then changes back to high vacuum again. At this point, due to the one-way air-pressure-regulating valve 24, the vacuum advanced ignition is delayed to permit a complete combustion in a rich mixture ratio. When the single chip vacuum detection transducer 11 detects the signal, it shall activate the control circuit 13 to disconnect the air-conditioning compressor for a set time so as to reduce the engine load effect and thereby enhances the horsepower speedability and reduces the fuel consumption.

From the above description, it can be understood that the present invention of an automotive acceleration-horsepower control means employs the principle of vacuum pressure differential to properly disconnect the air-conditioning compressor at the time of starting and/or during speeding up. In this way, the disadvantage of insufficient speedability at starting or during running because of using the air-conditioning at the same time can be improved while the engine of car can be protected, fuel can be minimized, and undesirable air pollution caused by a car can be somewhat prevented.

What is claimed is:

1. An automotive acceleration-horsepower control, comprising:

a single chip vacuum detection transducer having an input coupled in fluid communication with an intake manifold of an automobile for detecting variations in vacuum therein, said vacuum detection transducer converting said detected variations in vacuum to a voltage signal coupled to an output thereof;

a comparison circuit having a first input coupled to a node between a fixed resistance and a variable resistance for establishing a reference potential and a second input coupled to said output of said vacuum detection transducer for coupling said voltage signal thereto, said comparison circuit generating an actuation signal on an output thereof responsive to a magnitude of said voltage signal exceeding a magnitude of said reference voltage;

timing means having an input coupled to said comparison circuit for generating a delay voltage signal, said timing means including a timing integrated circuit, a resistance and a capacitance, said timing means providing said delay voltage signal to an output thereof for a predetermined time period responsive to receipt of said actuation signal from said comparison circuit;

an amplification circuit having an input coupled to said output of said timing means for providing an amplified delay voltage on an output thereof; and, a relay having normally closed contacts connected between an air-conditioning compressor and a the automobile's power supply and an input coupled to said output of said an amplification circuit to open said normally closed contacts and thereby disconnect the air-conditioning compressor from the power supply for said predetermined time period responsive to receipt of said amplified delay voltage.

2. The automotive acceleration-horsepower control as recited in claim 1, further comprising a one-way air-pressure regulating valve coupled between the automobile's intake manifold and an ignition advance diaphragm of the automobile to delay advancing ignition timing upon acceleration of the automobile and thereby permit such ignition advance to be preceded by opening of said normally closed contacts.

* * * * *